Oct. 25, 1932.　　　J. J. VIENNEAU　　　1,884,409

COIL WINDING MACHINE

Filed Aug. 26, 1927　　　3 Sheets-Sheet 1

Inventor:
Jacob J. Vienneau,
by *Alexander S. [illegible]*
His Attorney.

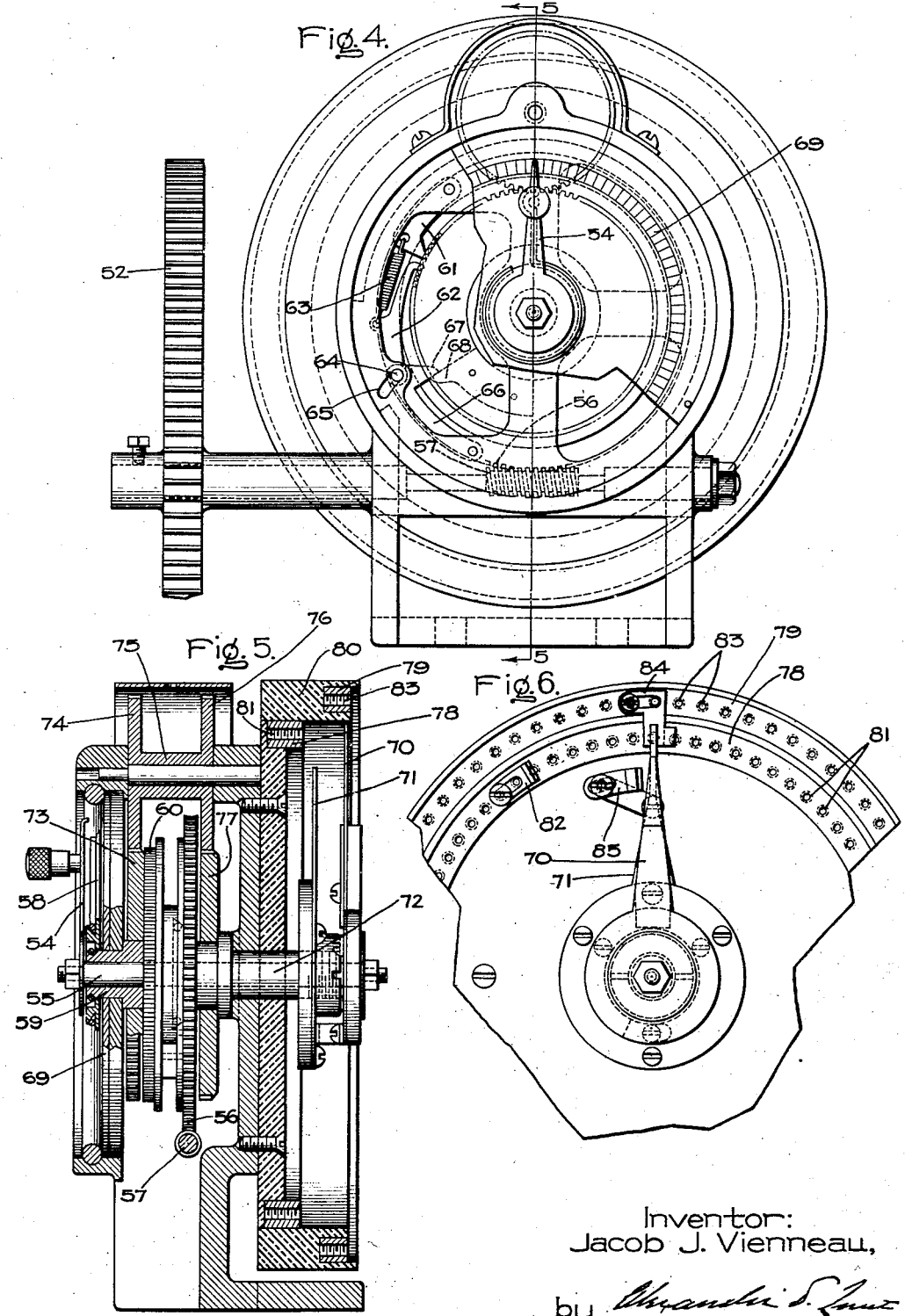

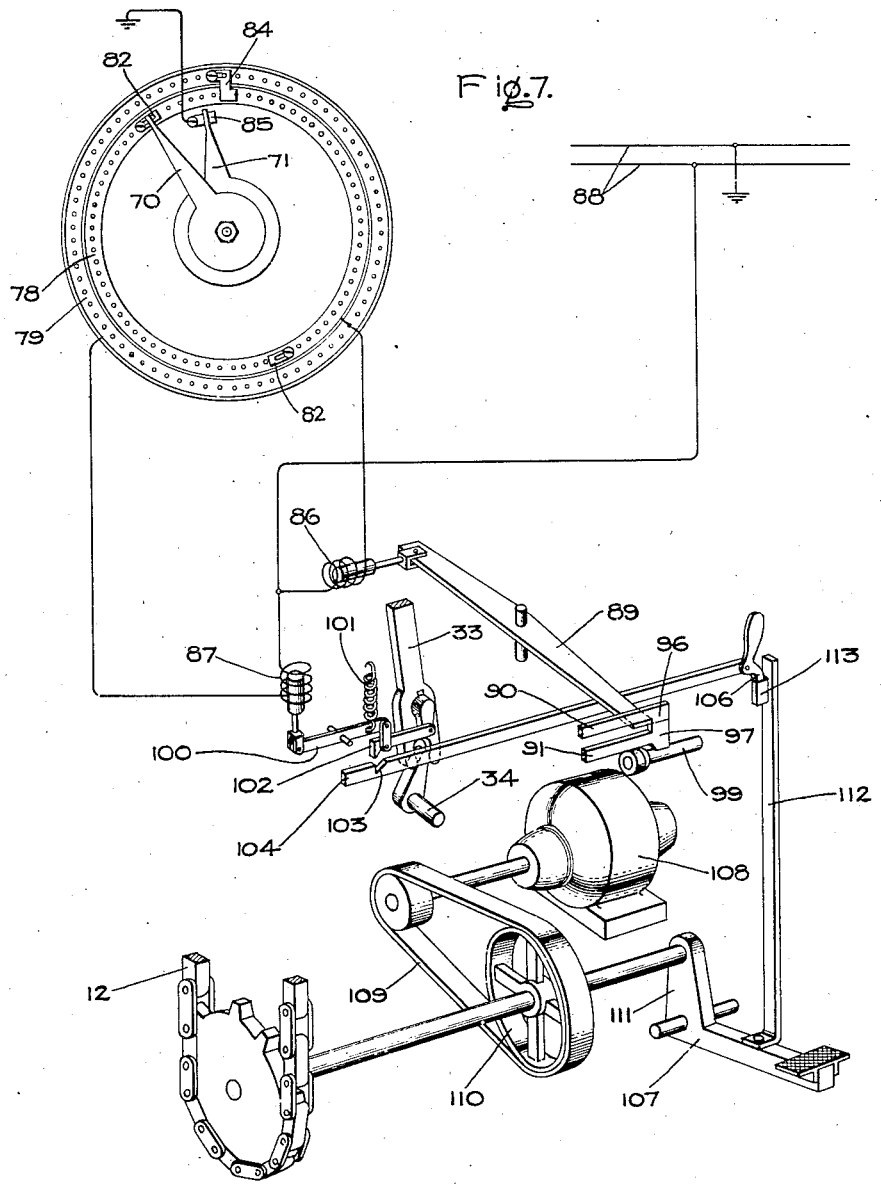

Patented Oct. 25, 1932

1,884,409

UNITED STATES PATENT OFFICE

JACOB J. VIENNEAU, OF PITTSFIELD, MASSACHUSETTS, ASSIGNOR TO GENERAL ELECTRIC COMPANY, A CORPORATION OF NEW YORK

COIL WINDING MACHINE

Application filed August 26, 1927. Serial No. 215,703.

My invention relates to coil winding machines and has for its object the provision of means whereby the layers of the coil may be tapered.

More specifically, my invention relates to automatic machines for winding electrical conductors and the like into coils. My invention is particularly applicable to the winding of transformer coils, field coils, etc. In one of its aspects my invention relates to means for automatically tapering the last layers of the coil for the purpose of obtaining greater electrical clearance between coils when they are arranged in end to end relation, and between the coils and ground.

In carrying out my invention, I provide auxiliary means for controlling the feeding means for the conductor as the coil is being wound, whereby after a predetermined number of layers have been wound the feeding means is reversed before the end of the previous layer is reached. I also provide means for automatically stopping the winding machine when the coil has been completed.

Figure 1:
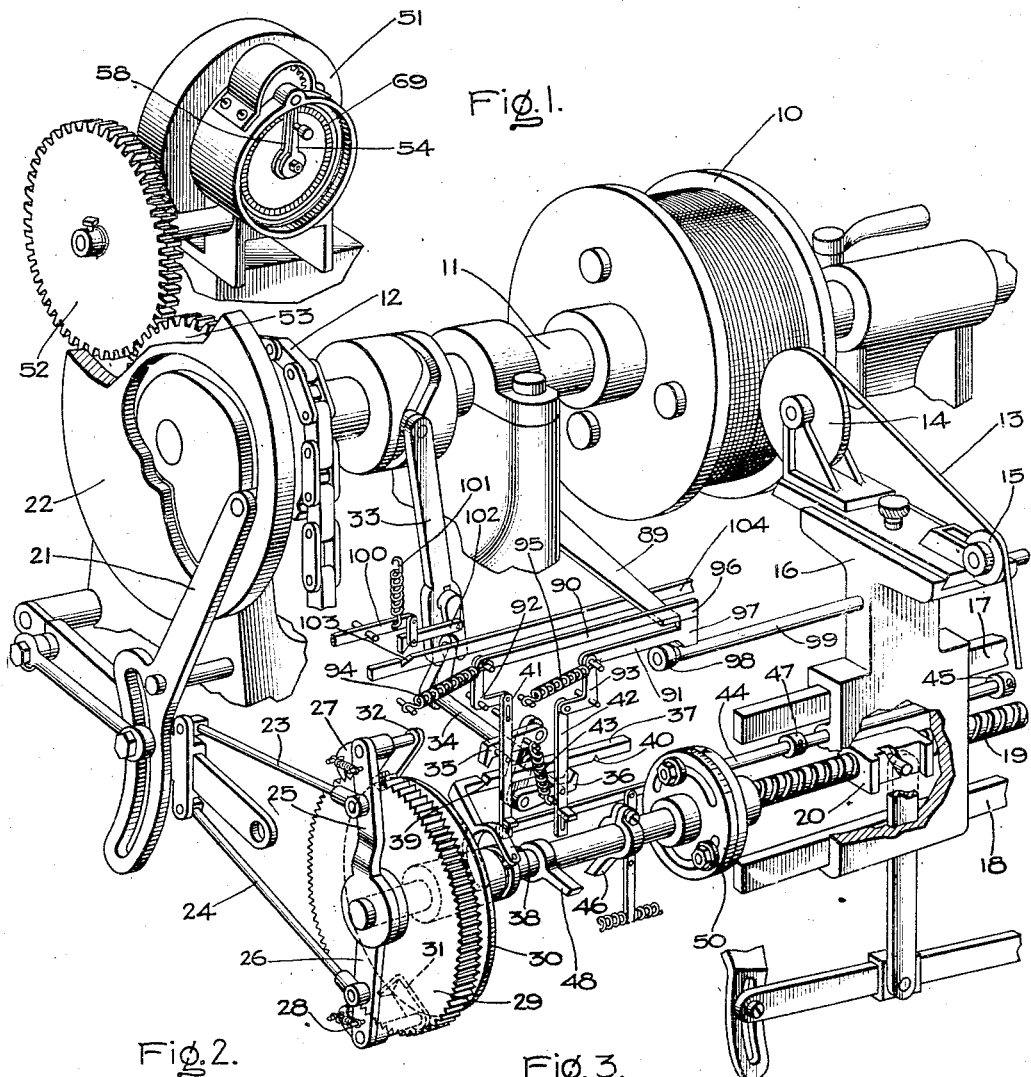
Figure 2:
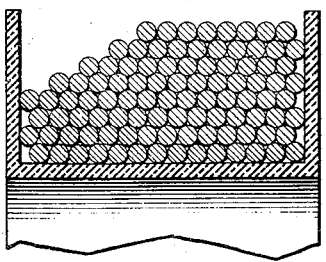
Figure 3:
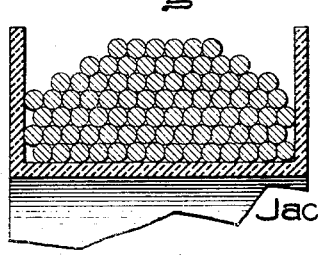

For a more complete understanding of my invention reference should be had to the accompanying drawings in which Fig. 1 is a fragmentary view in perspective of a coil winding machine embodying my invention; Figs. 2 and 3 are fragmentary sectional views showing coils wound in accordance with my invention; Fig. 4 is an enlarged front elevation view partly in section of control means for the winding machine; Fig. 5 is a section view of Fig. 4 taken along the line 5—5 of Fig. 4 looking in the direction of the arrows; Fig. 6 is a fragmentary rear view of the device shown in Fig. 4; Fig. 7 is a fragmentary view showing details of the electrical control circuits and the means for stopping the machine.

Referring to the drawings, I have shown my invention in one form as applied to a coil winding machine such, for example, as described and claimed in my Patent No. 1,504,004, dated August 5, 1924. Certain details of the construction and operation of the machine will be clear from the description contained in my aforesaid patent, and consequently these features will be described but briefly herein. Referring to Fig. 1, the spool 10 on which a coil is being wound, is mounted on a shaft 11 which is driven by means of a chain 12 from a suitable source of power, such as an electric motor. It will be understood that the spool 10 is releasably secured to the shaft 11 so that the spool may be removed upon the completion of the winding operation, or the spool may be therein arranged, such as in parts, to permit the removal of the completed coil. As shown in the drawings the electric conductor 13 or other material to be wound, passes over two rollers 14 and 15 by means of which it is guided so as to be wound in layers on the spool as the spool is rotated. The guides 14 and 15 are carried on a suitable frame or carriage 16 which moves on guide bars 17 and 18 in a direction parallel with the axis of the shaft 11.

The frame 16 is moved back and forth on its supports 17 and 18 as the layers are wound by means of a screw shaft 19 which co-operates with a nut 20 carried by the frame. This screw is turned in the proper direction to give the desired movement of the frame by suitable driving mechanism comprising a lever 21 which is oscillated by means of a heart-shaped cam 22 secured to the shaft 11. The lever 21 reciprocates rods 23 and 24 which in turn are connected to oscillate arms 25 and 26 rotatably mounted on the screw shaft 19. These arms carry pawls 27 and 28, respectively, which are biased by springs to engage with a ratchet driving wheel 29 secured to the screw shaft 19. Pawls 27 and 28 tend to rotate the screw shaft in opposite directions, and a disc member 30 is mounted on the screw shaft so as to be slidable thereon for controlling the engagement of the pawls, whereby one pawl or the other is allowed to engage with the ratchet wheel to give a desired direction of rotation of the screw shaft. As shown, the disc 30 is moved toward the right on the screw shaft to engage the cam member 31 on the pivot shaft of the pawl 28 whereby the pawl 28 is disengaged, and in this position the disc disengages a cam arm 32 whereby the pawl 27 engages the ratchet wheel.

The position of the disc 30 is controlled by means of an oscillating lever arm 33 which in turn oscillates a shaft 34 carrying oppositely disposed pawls 35 and 36. Situated between the pawls 35 and 36 is a horizontal bar 37 which terminates in a yoke 38 by means of which the disc 30 may be moved to the left or the right. This bar 37 contains nicks or notches 39 and 40 in which the pawls 35 and 36 are adapted to engage respectively so as to move the disc 30 to the left or the right. The pawls are held out of engagement with the notches 39 and 40 by suitable means shown as vertical bars 41 and 42 provided with suitable pins which engage with the pawls to hold them normally out of engagement with the notches as shown in the drawings, the pawls being biased toward each other by means of a spring 43. The lower ends of the bars 41 and 42 are secured to a horizontal bar 44, pin and slot connections being provided whereby the bar 41 can be moved downward and the bar 42 moved upward. As the frame 16 completes its movement toward the right for the completion of a layer it engages a stop 45 on the rod 44 whereby the rod is moved toward the right and with it the lower ends of the bars 41 and 42. This brings a projection on the lower end of the bar 42 in the path of an arm 46 on the screw shaft which would then be moving in a direction to lift the bar 42 when it engages the projection at the lower end of the bar. This releases the pawl 36 which thereupon drops into a notch 40 and as it is oscillated moves the bar 37 toward the right and with it the plate 30 to reverse the rotation of the screw shaft 19. The reversing mechanism would then be in the position shown in the drawings. Upon the completion of a layer in the opposite direction with the frame moving toward the left, the frame engages a stop 47 whereby the rod 44 is moved toward the left to bring a projection on the lower end of the bar 41 in the path of an arm 48. The bar 41 is thereby depressed to allow the pawl 35 to engage with the notch 39 and move the disc 30 toward the left to reverse the screw shaft, as will be understood from the previous description.

A loose coupling 50 is provided in the screw shaft, whereby when the rotation of the screw shaft is reversed at the end of each layer the reversal of the frame 16 is delayed throughout a definite movement of the spool. The first shifting movement of the frame in the opposite direction in order to begin a new layer may be partially or wholly taken up by the lost motion in the coupling 50. The object of this coupling is to more accurately place the first turn of each layer and thus produce a more compact winding, as will be understood with reference to my aforesaid patent. This cam 22 is of such shape that the lever 21 is oscillated once each revolution of the spool whereby the frame 16 is advanced at the end of each turn by an amount equal to the width of the conductor so as to guide the conductor into the next turn. The turns are thus wound circumferentially on the coil, the conductor being shifted at the end of each turn to begin the next turn.

My present invention has for its object to provide auxiliary means for automatically reversing the screw shaft 19 before the end of the layer is reached in order to wind the last layers of the coil in tapered formation as indicated in Figs. 2 and 3. In carrying out this feature of my invention, I provide a control device 51 (Fig. 1) which is driven from the shaft 11 through gears 52 and 53. Referring to Figs. 4, 5 and 6, the control device 51 comprises a fast moving pointer 54 secured to a shaft 55 which is driven by means of a worm wheel 56 with which co-operates a worm 57, the worm 57 being secured on the shaft of the gear wheel 52 (Fig. 1). This pointer 54 makes a complete revolution for a predetermined number of turns, such as 200 turns. A slow moving pointer 58 is also provided having the same axis as pointer 54. This pointer is mounted on a sleeve 59 which is driven by a ratchet wheel 60. The driving means for the ratchet wheel 60 comprises two pawls 61 and 62, Fig. 4, which are held in engagement with the ratchet wheel by means of a spring 63. The pivot 64 of pawl 62 is mounted in a slot 65 so directed that when the pivot is moved to the lower end of the slot the pawl 62 is given circumferential movement in a counter-clockwise direction, as viewed in Fig. 4, whereby the ratchet wheel 60 is advanced in the same direction. The pawl 61 locks the ratchet wheel against movement in the opposite direction. In order to operate the pawl 62, a lever arm 66 carrying a cam 67 is secured to the pivot 64. Preferably the slot 65 is in the shape of an arc having for its center the pivot of the arm 66. Co-operating with cam 67 is a cam 68 which is driven by the shaft 55 and is so related to the pointer 54 that when the pointer completes a revolution, its movement being in a counter-clockwise direction as viewed in Fig. 4, the cam 68 engages the cam 67 whereby the pawl 62 is moved to advance the pointer 58. A suitable scale 69 is provided for the pointer 54, this scale being divided into divisions. It is assumed that the zero position of the pointers 54 and 58 is the position shown in Fig. 4, i. e. pointing upward. Upon each revolution of pointer 54, the pointer 58 is advanced one division in the same direction.

As shown in Fig. 5, fast and slow pointers 70 and 71 are provided on the opposite side of the control device 51. The pointer 70 is secured directly to the shaft 55, while the pointer 71 is secured to a sleeve 72 which is driven from sleeve 59 by means of gears 73, 74, sleeve 75 and gears 76 and 77. A contact ring 78 is mounted just behind the fast pointer 70, and a second contact ring 79 of larger diameter surrounds the pointer 70. These contact rings are mounted on a support 80 made of suitable insulating material, such as hard rubber. The contact ring 78 is provided with a series of tapped holes 81 corresponding in number and position to the division of the scale 69, by means of which one or more contact devices 82 may be secured to the ring 78 at desired positions around the ring, this contact 82 being adapted to engage the pointer 70 and establish an electrical circuit as the pointer moves over it. The contact ring 79 is provided with a similar series of tapped holes 83 whereby one or more contacts 84 may be secured thereto in selected positions and so as to extend over the path of movement of the pointer 70 whereby the pointer 70 in passing beneath will engage each contact 84 and establish an electric circuit. A contact 85 is secured to the support 80 in the path of movement of the slow pointer 71 so as to be engaged by the slow pointer to establish a circuit.

Referring to Fig. 7, the pointers 70 and 71 control circuits through operating coils 86 and 87. As shown, one terminal of each of the coils is connected to one side of a source of electrical supply 88. The remaining terminal of the coil 86 is connected to the contact ring 78, while the remaining terminal of the coil 87 is connected to the contact ring 79. The contact 85 is connected to ground as is also the opposite side of the supply source 88. It will thus be observed that after the pointer 71 has been moved to engage the contact 85, a circuit will be closed for the coil 86 when the pointer 70 engages the contact 82, the two pointers being electrically connected together, and when the pointer 70 engages the contact 84 a circuit will be closed for the coil 87. The coil 86 operates a lever arm 89 which controls the reverse mechanism of the machine, while coil 87 operates a suitable trip device to stop the machine.

Referring to Fig. 1, one end of the lever 89 is situated between two horizontal arms 90 and 91 which are connected respectively at their left hand ends, as viewed in Fig. 1, to the bars 41 and 42, these connections being effected by means of bell cranks 92 and 93. Springs 94 and 95 are connected to the bell cranks, respectively, whereby the bar 41 is held in its uppermost position and the bar 42 is held in its lowermost position. At their right hand ends, as viewed in Fig. 1, the bars 90 and 91 are provided with portions 96 and 97 off-set toward each other constituting projections against which the lever 89 engages to move one or the other of the bars toward the right. The particular bar which is to be moved by the lever 89 is determined by raising and lowering the ends of the bars which is accomplished by means of a cam 98 carried by a rod 99 which in turn is secured to the frame 16. This rod 99 is secured to the frame by means of a friction connection whereby the bar is carried by the frame toward the right until the cam 98 has raised the bars 90 and 91 and thereafter the bar 99 remains stationary, the frame 16 sliding with relation thereto. When the frame 16 moves toward the left the bars 96 and 97 are lowered, and the bar 99 thereafter slides with respect to the frame, since the movement of the bar 99 is limited by suitable stops not shown.

In the operation of the machine, it is contemplated that the pointers 54 and 58 will be set to correspond with the number of turns to be wound on the coil. In making this setting the pointers are moved to show the turns to be wound, and during the winding operation the pointers are moved back toward their zero positions. Let it be assumed that one turn of the pointer 54 corresponds to 200 turns, and one division on scale 69 corresponds to 200 turns for the pointer 58. For a coil having 546 turns, for example, ten full layers of 40 turns each and four tapered layers having a total of 146 turns, the pointer 58 would be moved clockwise over three spaces on the scale 69 and the pointer 54 would be moved 54 spaces in a counter-clockwise direction there being 54 turns less than 600 turns. It will be understood that a slip connection is provided between the sleeve 59 and the ratchet wheel 60 to provide for setting of the pointer 58, and a slip connection is also provided between the shaft 55 and the worm wheel 56 to provide for the setting of the pointer 54. The pointers 70 and 71 are moved with the pointers 54 and 58 and consequently are given the same settings, although obviously the movement of these pointers, as viewed in Fig. 6, will be in the opposite direction since Fig. 6 is a rear view of Fig. 4.

At this time one or more contacts 82 are secured to the ring 78 in peripheral positions corresponding to the required reversals to wind the last tapered layers on the coil. A contact 84 is secured in the zero position to stop the machine after the desired number of turns have been wound, and also other contacts 84 may be secured to stop the machine at the desired points when taps leads are to be connected.

The operation of the machine is substantially the same as described in my aforesaid patent as long as the full layers are being wound, the pointers 54 and 70 being rotated in the directions previously indicated and the pointers 58 and 71 being returned one division toward zero for each revolution of pointers 54 and 70. When the coil has been completed with the exception of the turns in the tapered layers the pointer 71 is moved into engagement with the contact 85. A circuit is now completed for the coil 86 to reverse the machine wherever the pointer 70 engages with a contact 82 whereby the tapered layers are wound, and when the winding is completed pointer 70 engages the contact 84 to close a circuit for the coil 87 whereby the machine is stopped.

The operation of winding the tapered layers may be clarified by the following description with reference to the particular coil previously referred to. When the 400 turns for the full layers have been wound, the pointer 54 will be in the position in which it was originally set, since it has been turned through two complete revolutions. Let it be assumed now that a coil similar to that shown in Fig. 2 is being wound, the layers being tapered at one end only, and assume further that four tapered layers will be wound, substantially as shown in Fig. 2, these layers having a combined number of turns of 146 as previously indicated and having respectively 39, 37, 36 and 34 turns. After completing the full layers, the frame will be reversed in the usual manner, and after winding on 39 turns for the first tapered layer, the frame will be reversed by the engagement of contact arm 70 with a properly positioned contact 82. As a matter of fact, the frame will be reversed somewhat before the 39 turns have been wound on, but the wire will tend to remain in that layer and complete these turns before it is finally caused to jump over to the next layer due to the movement of the frame. The effect is to cause the wire to jump one or two turns before the next tapered layer is started, as will be noted from an examination of Fig. 2. The second tapered layer is now wound, after which the frame is reversed in the usual manner and the third tapered layer wound. At the end of this layer, the arm 70 engages another contact 82 whereby the frame is again reversed. Upon the completion of the coil the pointer 70 engages the contact 84 to stop the machine. The operation in the winding of a coil such as shown in Fig. 3 will be understood from the previous description. In this case, additional contacts 82 will be provided in the proper positions to reverse the frame at the end of its travel toward the right.

Referring to Figs. 1 and 7, the coil 87 may be arranged to operate a pivoted arm 100. This arm is normally held in raised position by a spring 101, so as to hold a pawl 102 out of engagement with a notch 103 in a horizontal bar 104. The pawl 102 is connected to the oscillating lever 33 so as to be given oscillatory motion therewith. The bar 104 is pivotally connected to a latch 106 for a foot pedal 107 which controls the operation of the machine. As shown the machine is driven by an electric motor 108 which is connected through a belt 109 to a pulley 110. This pulley is mounted on a rocker arm 111 which is operated by the foot pedal, whereby when the pedal is depressed by the operator the pulley 110 is swung toward the right to tighten the belt and thereby establish a driving connection. A suitable sprocket wheel is connected on the same shaft with the pulley 110 for the drive chain 12. An upright rod 112 is secured to the foot pedal, and when the foot pedal is depressed a projection 113 on this rod slips under the latch 106 to secure the foot pedal. It will be observed that when the coil 87 is energized the pawl 102 is released and drops into notch 103, and as the pawl is oscillated it moves bar 104 toward the left whereby the latch 106 is moved to disengage the projection 113.

While I have described my invention as embodied in concrete form and as operating in a specific manner in accordance with the provisions of the patent statutes, it should be understood that I do not limit my invention thereto since various modifications thereof will suggest themselves to those skilled in the art without departing from the spirit of my invention, the scope of which is set forth in the annexed claims.

What I claim as new and desire to secure by Letters Patent of the United States is:—

1. A coil winding machine for electrical conductors and the like comprising in combination with a spool, means for rotating said spool, means for feeding said conductor to said spool, means for reversing said feeding means at the end of each layer, electro-responsive means controlling said reversing means, a circuit for said electro-responsive means, a contact member connected in said circuit, an operable connection between said spool and said contact member whereby the latter is driven with said spool, contacts arranged to be connected in said energizing circuit and adjustable to predetermined positions in the path of movement of said contact member so that said contacts are successively engaged by said contact member as it is moved with said spool whereby said circuit is controlled to effect reversal of said feeding means at predetermined intervals after a predetermined number of full layers have been wound so as to wind on a predetermined number of layers of successively decreasing lengths.

2. A coil winding machine for electrical conductors and the like comprising in combination with a spool, means for turning said spool and for feeding said conductor along a predetermined circumference of said spool, means for shifting said feeding means from one turn to the next, means for reversing said shifting means at the end of each layer, and auxiliary means driven with said spool for reversing said shifting means before the end of each layer after a preselected number of layers have been wound so as to taper a preselected number of the layers last wound on the coil, said auxiliary means comprising an electro-responsive device controlling said reversing means arranged upon energization thereof to effect reversal of said shifting means, a contact device controlling said energizing circuit including a contact ring member, contacts adjustable on said ring member to preselected positions, a contact arm arranged for rotation on the axis of said contact ring member to contact with said adjustable contacts and means for driving said contact arm at a speed bearing a predetermined ratio with the speed of said spool.

3. A coil winding machine for electrical conductors and the like comprising in combination with a spool, means for rotating the spool, means for feeding said conductor to said spool, means for reversing said feeding means at the end of each layer, an electromagnetic device, a circuit therefor, means operated by said electromagnetic device for reversing said feeding means, a contact arm connected in said circuit arranged for movement over a fixed path of motion in a predetermined direction, means for driving said contact arm at a speed bearing a predetermined ratio with the speed of said spool, a contact member connected in said circuit and provided with contacts to cooperate with said contact arm, and adjustable to preselected positions in said path of motion to be successively engaged by said arm to close said circuit at predetermined intervals after a preselected number of layers have been wound so as to wind on a preselected number of short layers of successively decreasing lengths.

4. A coil winding machine for electrical conductors and the like comprising in combination with a spool, means for rotating the spool, means for feeding said conductor to said spool, means for reversing said feeding means at the end of each layer, an operating coil, a circuit therefor, means operated by said coil for reversing said feeding means, a contact device comprising a contact ring member connected in said circuit, contacts adjustable to preselected positions on said ring member, a contact arm connected in said circuit and rotatably mounted on the axis of said ring member arranged to engage said contacts so as to close said circuit at predetermined intervals to thereby wind on a predetermined number of short layers of successively decreasing lengths after a predetermined number of full layers have been wound.

5. A coil winding machine for electrical conductors and the like comprising in combination with a spool, means for rotating said spool, means for feeding the conductor to said spool and means for reversing said feeding means at the end of each layer, auxiliary control means for said reversing means including a control member arranged to move over a fixed path of motion in a predetermined direction, means for moving said control member at a speed bearing a predetermined ratio with the speed of said spool, means adjustable to preselected positions in said path of motion arranged to be successively engaged by said control member and when engaged by said control member to effect reversal of said feeding means before the end of a layer so that after a predetermined number of layers have been wound on said feeding means is reversed for subsequent layers before the end of the spool has been reached so as to wind on a plurality of short layers.

6. A coil winding machine for electrical conductors and the like comprising in combination with a spool, means for rotating said spool, means for feeding said conductor to said spool and means for reversing said feeding means at the end of each layer, an operating coil, means operated by said coil controlling said reversing means so that when said coil is energized said feeding means is reversed before the end of the layer, a circuit for said coil, a contact arm in said circuit arranged for rotation on a substantially fixed axis of revolution, means for driving said arm at a speed bearing a predetermined ratio with the speed of said spool, and stationary contacts in said circuit adjustable to predetermined positions in the path of motion of said contact arm arranged to engage therewith to close said circuit at predetermined intervals after a number of layers have been wound so as to wind on a plurality of short layers of successively decreasing lengths.

In witness whereof, I have hereunto set my hand this 24th day of August, 1927.

JACOB J. VIENNEAU.